(12) United States Patent
Abdel-Maksoud et al.

(10) Patent No.: US 7,517,266 B2
(45) Date of Patent: *Apr. 14, 2009

(54) METHOD AND DEVICE FOR DISCHARGING EXHAUST GASES OF INTERNAL COMBUSTION ENGINE OF BOATS INTO THE WATER SURROUNDING THE BOATS

(75) Inventors: Moustafa Abdel-Maksoud, Berlin (DE); Hannes Schulze Horn, Gladbeck (DE); Kay Tigges, Harsefeld (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/594,634

(22) PCT Filed: Feb. 2, 2005

(86) PCT No.: PCT/EP2005/050457

§ 371 (c)(1),
(2), (4) Date: Apr. 20, 2007

(87) PCT Pub. No.: WO2005/092702

PCT Pub. Date: Oct. 6, 2005

(65) Prior Publication Data

US 2007/0270056 A1 Nov. 22, 2007

(30) Foreign Application Priority Data

Mar. 29, 2004 (DE) .................. 10 2004 015 795
Sep. 27, 2004 (DE) .................. 10 2004 046 820

(51) Int. Cl.
*B63H 21/32* (2006.01)

(52) U.S. Cl. ................... 440/89 C; 440/89 B
(58) Field of Classification Search ............... 440/89 C
See application file for complete search history.

(56) References Cited

U.S. PATENT DOCUMENTS

| 3,084,651 A | 4/1963 | Parmenter |
| 4,631,032 A | 12/1986 | Nishida et al. |
| 4,979,917 A | 12/1990 | Haynes |
| 7,160,161 B2 * | 1/2007 | Abdel-Maksoud et al. 440/89 B |
| 2003/0119388 A1 | 6/2003 | Hauschildt |

FOREIGN PATENT DOCUMENTS

| DE | 100 61 487 C1 | 12/2000 |
| DE | 103 14 057 B3 | 5/2004 |
| DE | 10314057 | 5/2004 |
| GB | 1 323 871 A | 7/1973 |
| GB | 1323871 | 7/1973 |
| JP | 2001/239995 A | 2/2000 |
| WO | WO 93/07053 | 4/1993 |

OTHER PUBLICATIONS

International Search Report (PCT/ISA/210).

* cited by examiner

*Primary Examiner*—Jesus D Sotelo
(74) *Attorney, Agent, or Firm*—Harness, Dickey & Pierce, P.L.C.

(57) ABSTRACT

A method for the efficiency-increasing discharging of exhaust gases of internal combustion engines of boats into the water surrounding the boats is disclosed. The exhaust gases and a flow of water drawn from the surrounding water are mixed together in a low air pressure field, the low pressure of the low pressure field being produced by a reduction in the cross-section of the flow of water before mixing ensues.

22 Claims, 3 Drawing Sheets

METHOD AND DEVICE FOR DISCHARGING EXHAUST GASES OF INTERNAL COMBUSTION ENGINE OF BOATS INTO THE WATER SURROUNDING THE BOATS

PRIORITY STATEMENT

This application is the national phase under 35 U.S.C. § 371 of PCT International Application No. PCT/EP2005/050457 which has an International filing date of Feb. 2, 2005 which designated the United States of America and which claims priority on German Patent Application numbers 10 2004 015 795.2 filed Mar. 29, 2004 and 10 2004 046 820.6 filed Sep. 27, 2004, the entire contents of which are hereby incorporated herein by reference.

FIELD

The invention generally relates to a method for (for example performance-improving) emission of exhaust gases from internal combustion engines in boats or other marine vessels, into the water surrounding the marine vessels.

BACKGROUND

It is known for the exhaust gases from internal combustion engines in marine vessels to be introduced into the water surrounding the marine vessels, either in order to prevent visible emission of the exhaust gases (an exhaust-gas plume) or in order to make use of an extraction capability with the aid of existing waterjets. The extraction capability for exhaust gases through the outlet opening of the waterjet flow from the hull of a marine vessel is known, for example, from U.S. Pat. No. 4,979,917. However, this has the disadvantage that the internal combustion engine has to operate against the hydrostatic pressure of the water as a back-pressure, that is to say its performance is reduced.

This performance reduction is particularly major in the case of boosted diesel engines, whose exhaust-gas turbines are highly sensitive to back-pressure. For this reason, the exhaust gas from a boosted internal combustion engine is passed according to the proposal in DE 103 14 057 B3 into the snorkel tube of the submarine, in which the boosted internal combustion engine is arranged. However, this solution requires a very high degree of hardware complexity and increases the power requirement of the submarine when snorkeling, since the snorkel tube must be designed to be correspondingly more voluminous.

SUMMARY

At least one embodiment of the invention includes a method and/or a device which make it possible to achieve a considerable performance improvement in comparison to the previous extraction methods for exhaust gases from internal combustion engines in surface vessels or submarines. In at least one embodiment, the exhaust gases and a water flow, which is taken from the surrounding water, are mixed with one another in a dedicated device in a reduced-pressure field, with the reduced pressure for the reduced-pressure field being produced by a reduction in the cross-sectional area of the water flow before mixing. The water flow is in this case simply produced in a pump upstream of the device.

The combination of a reduced-pressure field for the exhaust gas with a mixer for exhaust gas and water results surprisingly, in a possible improvement in the performance, which is considerable in particular in the case of submarines.

For surface vessels, this results in the advantageous capability to emit the exhaust gases relatively deep under the water surface. This prevents the possibility of the exhaust gases being detected, thus resulting in the exhaust gases being emitted in a so-called "signature-free" manner from marine vessels, including submarines.

The "signature-free" emission of exhaust gases from submarines is known from DE 100 61 487 C1. However, a considerable amount of external energy is required in this case in order to overcome the static pressure of the water surrounding the marine vessel or a not inconsiderable decrease in performance must be accepted. As already mentioned, long exhaust-gas pipes are required in or on the snorkel tube in order to avoid this.

The emission of exhaust gases outside the hull of a marine vessel under water is known per se, for example from WO 93/07053. However, no mixing takes place in this case, but two flow elements are produced which run parallel without being mixed, in which case the corresponding device must be located only relatively slightly below the water. Further under water emission devices for exhaust gases are also known, for example from JP-2001/239995 A which, like a large number of similar solutions, discloses an ejector for exhaust gases.

An ejector such as this requires a considerable amount of external energy and does not lead to the desired mixing of the exhaust gas and water, since the highly accelerated, dense waterjet is not mixed with the gas that is supplied coaxially, and enters the water surrounding the marine vessel virtually unchanged, without actually conveying the gas.

At least one of the disadvantages described above may be avoided by the method according to at least one embodiment of the invention and/or the device according to at least one embodiment of the invention.

One advantageous refinement of at least one embodiment of the invention in this case provides for the reduction in the cross-sectional area of the water flow to be carried out in such a manner that an accelerated water flow is formed in the shape of a hollow cylinder, and in such a manner that the exhaust gases are introduced into the interior of the hollow-cylindrical water flow. This results in a reliable conveying effect for the gas which, advantageously interacting with the annihilation of the annular structure of the water flow at a short distance downstream from the mixing device, leads to a two-phase exhaust-gas/water mixture, which can no longer be detected.

A further refinement of at least one embodiment of the invention provides for the exhaust gases also to be passed to the outside of the hollow-cylindrical water flow. This embodiment of the method is particularly advantageous when very large exhaust-gas flows are involved, that is to say for example when the internal combustion engine is a gas turbine.

A further refinement of at least one embodiment of the invention provides for the hollow-cylindrical water flow to be caused to rotate, for example by a swirl producing device, such as blades, and for the exhaust gas also to be caused to rotate in the opposite direction to the hollow-cylindrical water flow, for example likewise by swirl producing device, such as blades. This results in the capability to produce the desired two-phase mixture over a very short movement distance through a guidance tube at or on the marine vessel. Furthermore, this results in a particularly fine and uniform distribution of the exhaust gas in the water and in the ideal case even in a homogeneous mixture.

One refinement of at least one embodiment of the invention in this case provides for the exhaust-gas flow to be caused to form a hollow-cylindrical shape, for example by way of a displacement body in the exhaust-gas flow. This advantageously makes it possible to produce an axial flow within the mixing device without any reverse flow, as is advantageous for mixing and production of reduced pressure.

A further refinement of at least one embodiment of the invention provides for the exhaust gas to be cooled to below 100 degrees C., for example via water injection, in order to reduce its volume before being introduced into the reduced-pressure field. This measure, which is known per se in naval vessels makes it possible to reduce the gas volume to such an extent that it is possible to use the conventional pipe diameters on submarines for the device, for example with an external diameter of 250 mm. At the same time, this highly advantageously prevents the formation of a three-phase mixture, for example composed of exhaust gas, steam and water, which is difficult to cope with.

A further refinement of at least one embodiment of the invention provides for the exhaust gas to be subjected to a pressure rise following the mixing with the water flow and after passing through the reduced-pressure field, for example in a widened exhaust-gas outlet pipe with a diffuser effect. A considerable diffuser effect, which generally increases the pressure to a sufficient extent, is intrinsically provided in the device, downstream from the displacement body used according to at least one embodiment of the invention. In accordance with the requirements, this can, if required, be even further increased simply by further widening of the mixture outlet pipe. This allows exhaust-gas outlet depths of more than 5 m to be achieved.

In order to carry out an embodiment of the method for emission of exhaust gases from internal combustion engines in marine vessels into the water surrounding the marine vessels, a device is provided which is in the form of an exhaust-gas/water mixer and has a reduced-pressure chamber. The performance-increasing exhaust-gas emission can thus advantageously be carried out with its further advantages.

One refinement of at least one embodiment of the invention in this case provides for a guidance device for the water to be arranged upstream of the reduced-pressure chamber in the flow direction, having an annular cross section so that a hollow-cylindrical waterjet is formed. This results in the formation of a waterjet, which allows the exhaust gas to be incorporated into the waterjet particularly advantageously. This reliably allows the extraction of the exhaust gas, and prevents the water and gas from being extracted into the surrounding water in an unmixed form.

A further refinement of at least one embodiment of the invention provides for a guidance device for the exhaust gas to be arranged upstream of the reduced-pressure chamber in the flow direction and to have an annular cross section, so that the exhaust gas also flows out in the form of a hollow cylinder. This highly advantageously results in two flow elements with large surfaces, which are extracted in a mixed form despite the major density differences between the two media.

A further refinement of at least one embodiment of the invention provides for the guidance device for the water to have guidance elements, in particular blades with a cycloid shape, by which the water can be caused to rotate. This results in an advantageous rotational movement of the water with little drag, if the exhaust-gas flow is caused to rotate in the opposite direction by appropriate guidance elements, that is to say in particular also blades with a cycloid shape, decisively improving the mixing of the two flow elements, and forming a homogenous exhaust-gas/water flow shortly downstream from the guidance device.

The water flow which is taken from the surrounding water is optionally produced by way of a radial pump or by way of an axial pump. A radial pump is appropriate when the pump is arranged, for example, on the free shaft end of a diesel engine, since this results in a particularly space-saving device, which is particularly advantageous for submarines. An axial pump can advantageously be used when additional guidance elements are provided which make use of the motion of the marine vessel through the water and take a flow element which has already been speeded up to the speed of the marine vessel. Furthermore, an axial pump such as this can be arranged immediately upstream of the mixing device, thus resulting in the water flowing into the mixing device without any deflection. The rotational movement of the axial pump can also be used to produce swirl, but the installation complexity is greater than that for the arrangement of a radial pump on the free shaft end, for example of a diesel engine.

It is generally sufficient for the drive power of the pump for the water flow to be 20-30 kW, in order to allow exhaust gas to be emitted at normal pressure at a water depth of 5 m from a diesel engine of more than 1000 kW. However, the performance improvement for this engine is several hundred kW.

A pump with a central shaft or else an external rotor may be used as the axial pump. This must be matched to the respective space conditions in the marine vessel.

One particularly preferred refinement of at least one embodiment of the invention provides for the mixing device to have an inner displacement body for the gas flowing to it. This advantageously also provides a hollow-cylindrical shape for the gas flow, and at the same time to prevent the gas/water mixture that is formed in the mixing device from flowing back into the guidance elements for the water flow and the gas flow. This advantageously results in reliable operation both for the production of the reduced pressure and for the mixing process.

The gas and water flows are advantageously introduced into the device via coaxial pipes for gas and water thus at this stage forming the annular shape for the gas flow and the water flow. This results in particularly advantageous flow conditions in the mixing device.

A cooling device for the exhaust gas considerably reduces its volume, so that the device according to at least one embodiment of the invention can be physically relatively small and may, for example, have an external diameter of 250 mm. In particular, this takes account of the space requirements in a submarine.

The device according to at least one embodiment of the invention has at least one shut-off device, which can be subjected to open-loop and closed-loop control, with monitoring devices which are advantageously connected in particular to the marine vessel control system or to the engine control system. A reliable locking circuit for the shut-off device can thus then be formed, and account can also be taken of the starting dynamics of the internal combustion engines and of the mixing device and outlet apparatus. In addition, non-return valves, in particular with position monitoring, are provided so that, overall, the same safety can be achieved for a submarine or for a surface vessel as that without the use of the device.

The method according to at least one embodiment of the invention and the device according to at least one embodiment of the invention are advantageously intended for use not only for submarines when snorkeling but also for surface vessels with internal combustion engines distributed in the marine vessel, in particular for internal combustion engine/generator sets distributed in the marine vessel. When used in submarines, the device is advantageously arranged at the stern end of the vessel in the wake of the fin or of the fin lower structure, and can optionally be integrated in the outer casing of the submarine, or can be designed such that it can be moved out of it. If arranged at the stern of the vessel in the wake from the fin or from the fin lower structure, it is particularly advantageous that the device does not produce any additional drag and is even used in an area of the submarine in which there is a turbulent flow, which assists the introduction of the two-phase mixture that is formed into the surrounding water.

When used for surface vessels, it is particularly advantageous for the devices each to be arranged with the internal combustion engines which are provided for them in different vessel safety areas. For surface vessels, such as corvettes or frigates, this then not only results in signature suppression of the exhaust gas, but also in a safety level which complies with the safety for, for example, fuel-cell systems which are arranged at a different point in the marine vessel. Interchangeability is thus possible.

For surface vessels, it is particularly advantageous in this case, and in some circumstances for underwater vessels as well, for the other exhaust gases that are produced in the marine vessel, for example the exhaust air from an air-conditioning system or the reformer exhaust air from fuel-cell systems, to be mixed with the exhaust gas from the internal combustion engines. This is advantageously possible because the exhaust gases are in fact discharged at a reduced pressure, that is to say no external energy is required for compression of the exhaust gases in order to emit them into the surrounding water.

BRIEF DESCRIPTION OF THE DRAWINGS

The invention will be explained in more detail with reference to example embodiments and drawings, from which further details of an inventive nature will become evident.

In detail.

DETAILED DESCRIPTION OF THE EXAMPLE EMBODIMENTS

Figure 1:
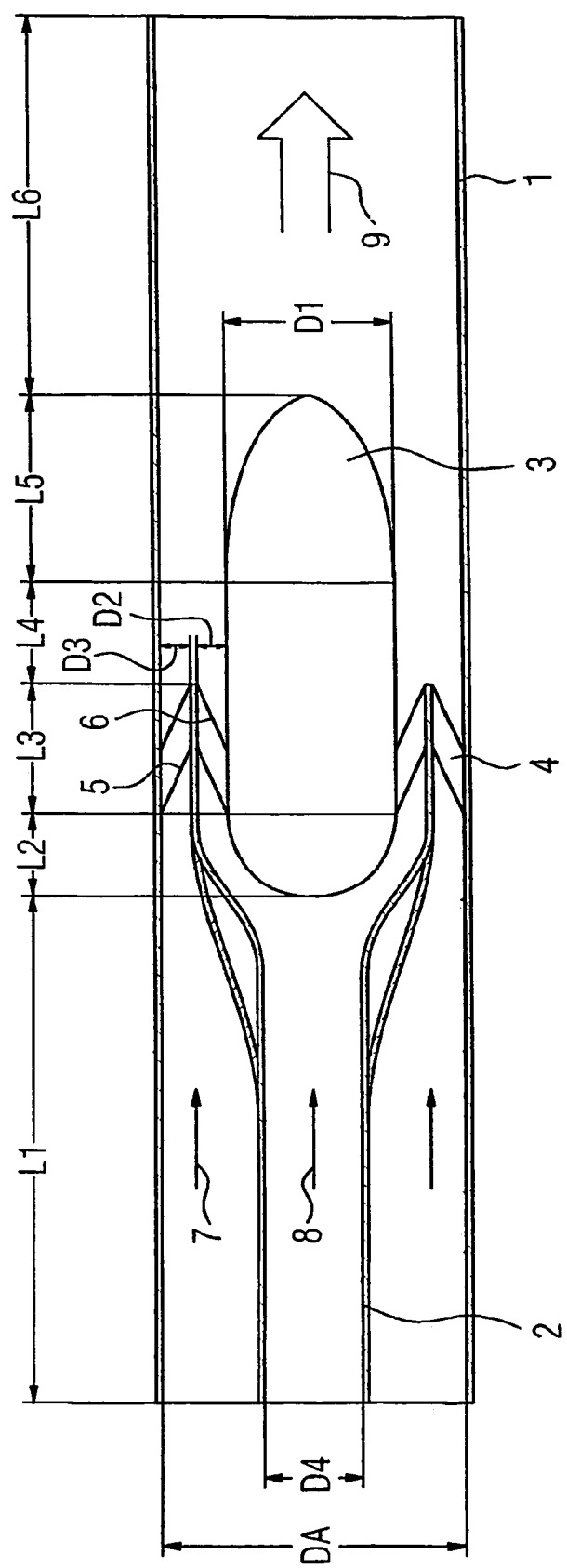
FIG. 1 shows a schematic longitudinal section through an exhaust-gas mixing and reduced-pressure device.

In FIG. 1, 1 denotes the housing pipe of the exhaust-gas emission line device, which is at the same time the pipe for introduction for the mixing and reduced-pressure production water. Element 2 denotes the gas pipe and 3 denotes the central displacement body, which is advantageous and significant to the invention, for gas and water. The reduced-pressure region according to an embodiment of the invention is formed on the outside of the widened area 4 around the displacement body 3. Guidance elements 5 and 6 are provided in order to introduce swirl into the water flow and gas flow, and can at the same time form a holder for the displacement body 3 and the widened water channel 4. The water which is supplied to the mixing and reduced-pressure production device is symbolized by the arrows 7, and the gas is symbolized by the arrow 8. The two-phase mixture that is formed is symbolized by the double-headed arrow 9.

The geometric relationships, that is to say the pipe diameters and the pipe section lengths in the device, are a quite major factor of the advantageous operation of the mixing and reduced-pressure production device. For this reason, FIG. 1 shows the individual lengths and the main diameters. The relationships between the dimensions in FIG. 1 are as follows:

$DA = 1.5$-$2.0\ D4$
$L1 = 3$-$4.5\ D4$
$L2 = 0.6$-$0.8\ D4$
$L3 = 0.8$-$1.2\ D4$
$L4 = 0.6$-$1.0\ D4$
$L5 = 1.3$-$1.7\ D4$
$L6 = 1.5$-$3.5\ D4$
$D1 = 1.2$-$1.5\ D4$
$D2 = 0.2$-$0.3\ D4$
$D3 = 0.2$-$0.3\ D4$
$D4$ is the diameter of the exhaust-gas pipe The relationships shown in the table are calculated for an exhaust-gas pipe with a diameter of 250 mm. These are calculated from one in which the exhaust gases from a typical, boosted submarine diesel are emitted into the surrounding water. A boosted diesel with exhaust-gas turbo chargers and a power of 1300 kW is regarded as a typical diesel. The exhaust-gas inlet temperature to the device is 90 degrees C., after it has been cooled as provided according to an embodiment of the invention. When the two-phase mixture of gas and water is introduced and the device is arranged in the wake of the submarine fin, or of a similar device on board the submarine, no additional measures are required for a good transition between the two-phase mixture and the surrounding water.

If installed at a different point on the submarine, or if installed in underwater emission systems of surface vessels, an additional guidance element may also be advantageous in order to produce a water flow with appropriate suction.

Figure 2:
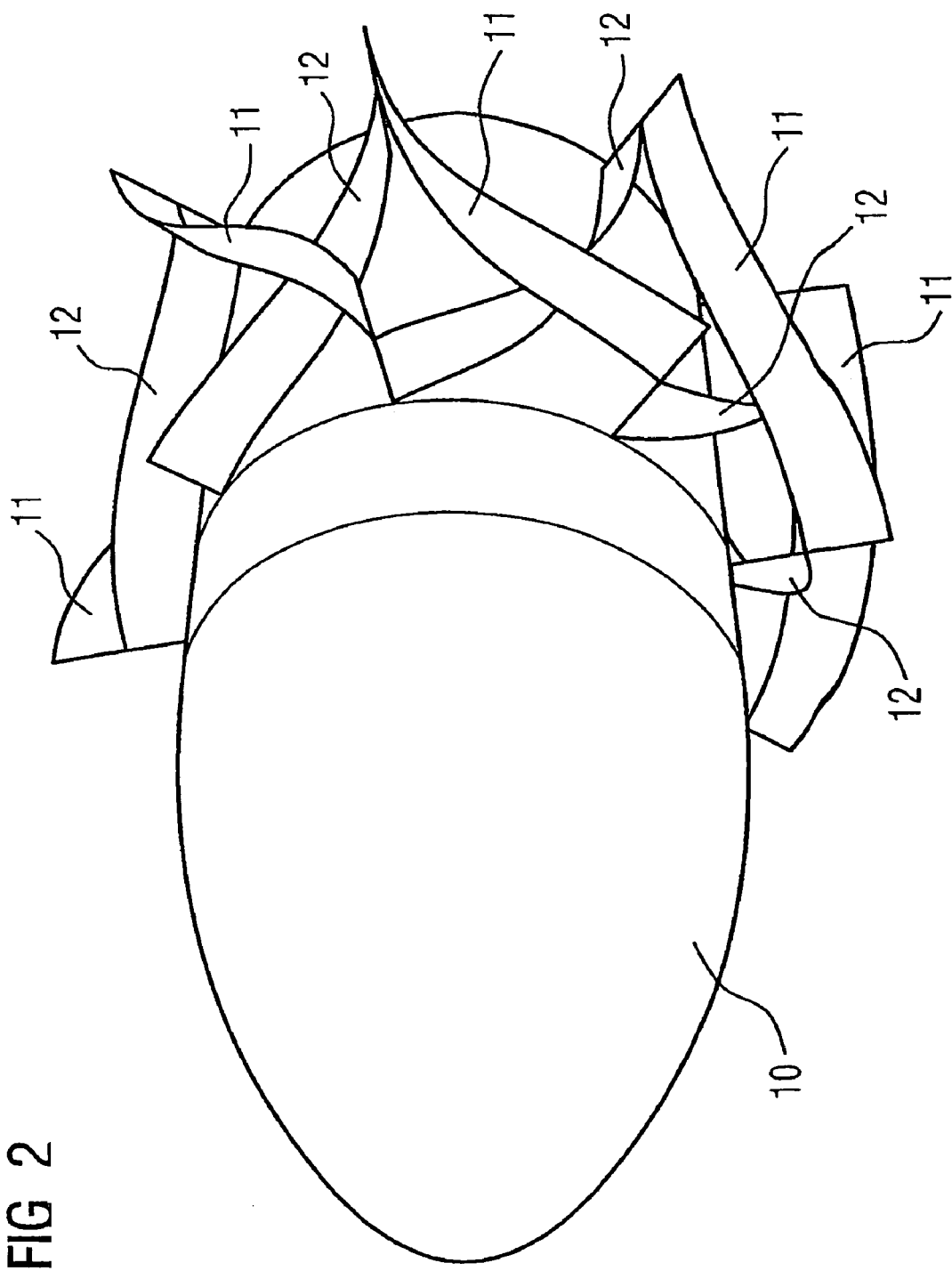
FIG. 2 shows a 3D illustration of the mixing blades with the central displacement body, seen from the outlet side.

In FIG. 2, 10 denotes the central displacement body and 11 the swirl producing elements, in this case cycloid blades, for production of swirl in the water, and 12 denotes the swirl producing elements which are located further inwards, in this case also cycloid blades, for the gas. The blade shape is in this case chosen so as to produce only a small amount of axial drag. The displacement body 10, which is lengthened to the rear, prevents reverse flow of the gas and of the water into the area of the swirl producing elements, and ensures reliable operation of the reduced-pressure mixing device. Other blade shapes may be chosen instead of the cycloid shape. This depends on the mixing/drag ratio which is intended to be achieved.

Figure 3:
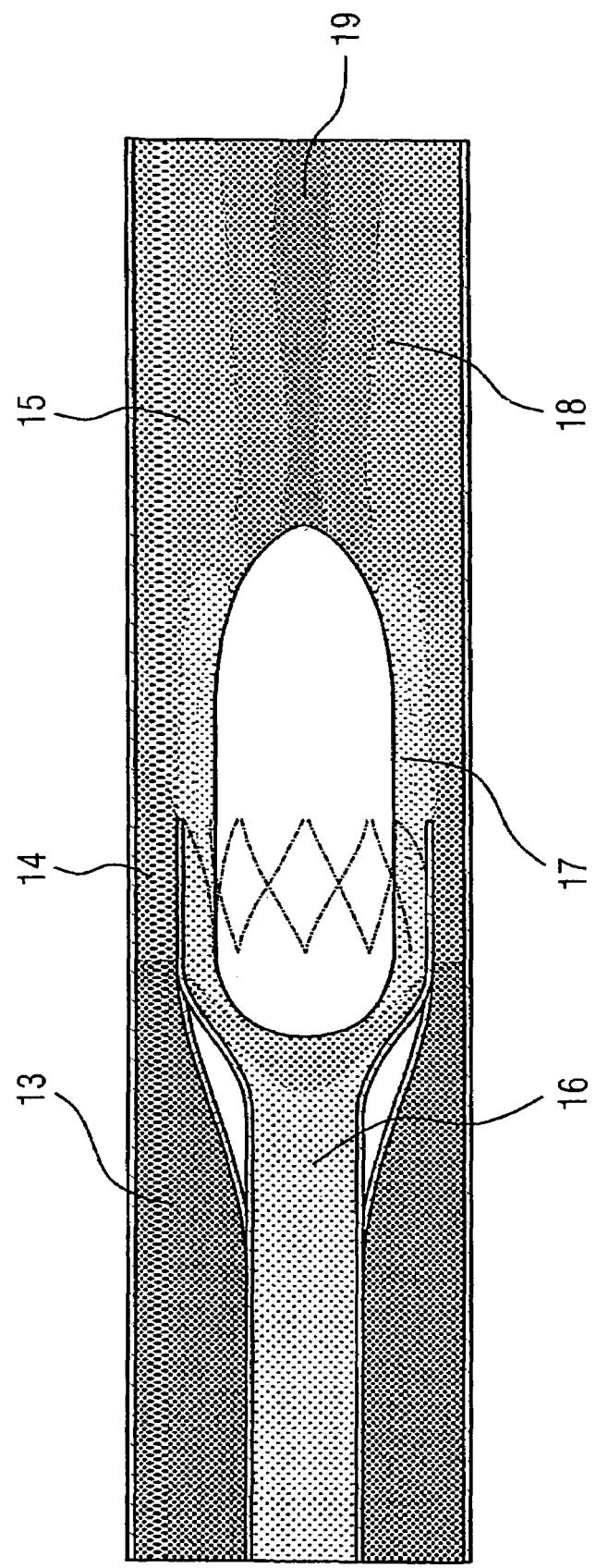
FIG. 3 shows the speed distribution of the two flow elements in the device, on a calculated basis.

FIG. 3 shows the various speeds of the two media of gas and water in the emission device, with the gray shade showing the different speeds. The speed of the water is at a minimum in the dark area 13, and increases in the area 14, as can be seen from the lighter gray, until a speed decrease with a pressure increase finally occurs in the area 15. The inlet-flow gas in the light area 16 is at its normal "exhaust" speed and is likewise highly accelerated on the displacement body. Finally, relative matching occurs with a particularly slow flow in the outlet-flow area from the displacement body in the area 18, the outlet-flow area from the device.

Swirling results in good mixing in this area 15, 18, so that the water-flow stability that occurs in the case of ejectors or waterjets undoubtedly does not occur. In fact, this results in a real two-phase mixture with a reduced pressure for the gas flowing out in the area 17, which results in the desired performance improvement, according to an embodiment of the invention, for boosted diesel engines. 19 denotes the diffuser area, in which the pipe diameter may be increased even further.

The relationships illustrated in the figures and which are shown in the table relating to FIG. 1 can be applied over a wide power range of internal combustion engines. The 1300 kW diesel that is used as the basis for calculation represents approximately the mid-range of the application area. Both considerably larger boosted diesel engines and smaller diesel engines can be operated with the same relationships for the device according to an embodiment of the invention. There are no limits at the bottom end of the performance of the corresponding internal combustion engines. Even gas turbine exhaust gases can be emitted in a similar manner under water, with a performance improvement.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for performance-improving emission of exhaust gases from internal combustion engines in submarines into the water surrounding the submarines, the method comprising:

mixing the exhaust gases and a water flow, taken from the water surrounding the submarines and produced in a pump device, with one another in a reduced-pressure field, the reduced pressure of the reduced-pressure field being produced by a reduction in the cross-sectional area of the water flow before mixing, the reduction in the cross-sectional area being carried out in such a manner that an accelerated water flow in the form of a hollow cylinder is produced, and the hollow-cylindrical water flow being caused to rotate.

2. The method as claimed in claim 1, wherein the exhaust gases are introduced into the interior of the hollow-cylindrical water flow which is produced by a stationary device.

3. The method as claimed in claim 1, wherein the exhaust gases are also passed to the outside of the hollow-cylindrical water flow.

4. The method as claimed in claim 1, wherein the exhaust gas is caused to rotate in the opposite direction to the hollow-cylindrical water flow.

5. The method as claimed in claim 1, wherein the exhaust-gas flow is caused to form a hollow-cylindrical shape.

6. The method as claimed in claim 1, wherein the exhaust-gas flow is cooled to reduce its volume before being introduced into the reduced-pressure field.

7. The method as claimed in claim 1, wherein the exhaust gas is subject to a pressure increase, after it has been mixed with the water flow and has passed through the reduced-pressure field.

8. The method as claimed in claim 1, wherein the hollow-cylindrical water flow is caused to rotate via the device including blades.

9. The method as claimed in claim 2, wherein the exhaust gases are also passed to the outside of the hollow-cylindrical water flow.

10. A device for emitting exhaust gases from internal combustion engines in submarines into the water surrounding the submarines, comprising:

a reduced-pressure chamber to mix the exhaust gases and a water flow, taken from the water surrounding the submarines and produced in a pump device, with one another in a reduced-pressure field, the reduced pressure of the reduced-pressure field being produced by a reduction in the cross-sectional area of the water flow before mixing, the reduction in the cross-sectional area being carried out in such a manner that an accelerated water flow in the form of a hollow cylinder is produced, and the hollow-cylindrical water flow being caused to rotate; and a stationary exhaust-gas pipe to introduce the exhaust gases into the device, in the form of a stationary exhaust-gas/water mixer.

11. The device as claimed in claim 10, further comprising:
a guidance device for the mixing water, arranged upstream of the reduced-pressure chamber in the flow direction, and including an annular cross section so as to form a hollow-cylindrical waterjet.

12. The device as claimed in claim 10, wherein a guidance device for the exhaust gas is arranged upstream of the reduced-pressure chamber in the flow direction and includes an annular cross section, so that the exhaust gas flows out in the form of a hollow cylinder.

13. The device as claimed in claim 12, wherein the guidance device for the water includes guidance elements to cause the water to rotate.

14. The device as claimed in claim 13, wherein the guidance device for the exhaust-gas flow includes guidance elements by which the exhaust gas is caused to carry out a rotating movement.

15. The device as claimed in claim 10, further comprising an inner displacement body for exhaust gas and water, which is arranged centrally in the device.

16. The device as claimed in claim 10, further comprising coaxial guidance tubes for the exhaust-gas flow and the water flow, with the exhaust gas being guided on the inside and the water on the outside.

17. The exhaust-gas emission device as claimed in claim 10, wherein the device is used to increase the performance of the boosted diesels for submarines when snorkeling.

18. The exhaust-gas emission device as claimed in claim 17, wherein the device is used at the stern of the marine vessel.

19. The exhaust-gas emission device as claimed in claim 17, wherein the device is used in the fin of the submarine.

20. The exhaust-gas emission device as claimed in claim 10, wherein the device is used to prevent exhaust-gas emission into the atmosphere for surface vessels, in particular for surface vessels with internal combustion engines distributed in the marine vessel.

21. The exhaust-gas emission device as claimed in claim 20, wherein the device is used with an internal combustion engine in a naval vessel, the internal combustion engine and the device being in a safety area of the naval vessel.

22. The exhaust-gas emission device as claimed in claim 20, wherein the device is used for surface vessels for emission of the other exhaust gases which are produced in a marine vessel or for reformer exhaust gases from fuel-cell modules.

* * * * *